United States Patent
Ishikawa

(10) Patent No.: US 10,975,744 B2
(45) Date of Patent: Apr. 13, 2021

(54) EXHAUST GAS PURIFICATION APPARATUS FOR MOTOR VEHICLES

(71) Applicant: TOYOTA JIDOSHA KABUSHIKI KAISHA, Toyota (JP)

(72) Inventor: Norio Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/573,010

(22) Filed: Sep. 17, 2019

(65) Prior Publication Data

US 2020/0102866 A1 Apr. 2, 2020

(30) Foreign Application Priority Data

Sep. 27, 2018 (JP) .............................. JP2018-181672

(51) Int. Cl.
| | |
|---|---|
| *F01N 3/20* | (2006.01) |
| *B01J 23/42* | (2006.01) |
| *B01J 23/44* | (2006.01) |
| *B01J 23/89* | (2006.01) |
| *F01N 3/023* | (2006.01) |
| *B01J 23/648* | (2006.01) |

(Continued)

(52) U.S. Cl.
CPC ............ *F01N 3/0233* (2013.01); *B01J 21/02* (2013.01); *B01J 23/06* (2013.01); *B01J 23/10* (2013.01); *B01J 23/42* (2013.01); *B01J 23/44* (2013.01); *B01J 23/464* (2013.01); *B01J 23/6484* (2013.01); *B01J 23/72* (2013.01); *B01J 23/755* (2013.01); *B01J 23/892* (2013.01); *F01N 3/202* (2013.01)

(58) Field of Classification Search
None
See application file for complete search history.

(56) References Cited

FOREIGN PATENT DOCUMENTS

| | | |
|---|---|---|
| JP | 5-171926 A | 7/1993 |
| JP | 2016-187766 A | 11/2016 |

(Continued)

OTHER PUBLICATIONS

Suzuki et al. JP2016-187766A—translated document (Year: 2016).*
Hoki, Y. JP2016-211516A—translated document (Year: 2016).*

*Primary Examiner* — Jelitza M Perez
(74) *Attorney, Agent, or Firm* — Dickinson Wright PLLC

(57) ABSTRACT

The present disclosure provides an exhaust gas purification apparatus for motor vehicles that has succeeded in suppressing peeling of a coat layer from an exhaust gas purification catalyst. Such exhaust gas purification apparatus for motor vehicles comprises: an exhaust gas purification catalyst comprising a substrate and a coat layer coated on the substrate comprising a microwave-absorbing material, a noble metal, and aluminum oxide ($Al_2O_3$); and a microwave-generating apparatus for heating the microwave-absorbing material located ahead of the exhaust gas purification catalyst with respect to an exhaust gas flow direction, wherein the microwave-absorbing material includes $NiFe_2O_4$, the noble metal includes at least one metal selected from the group consisting of platinum (Pt), palladium (Pd), and rhodium (Rh), and contents of zinc oxide (ZnO) and copper(II) oxide (CuO) in the coat layer are equivalent to or lower than the given levels.

7 Claims, 6 Drawing Sheets

(51) Int. Cl.
*B01J 23/46* (2006.01)
*B01J 21/02* (2006.01)
*B01J 23/06* (2006.01)
*B01J 23/72* (2006.01)
*B01J 23/10* (2006.01)
*B01J 23/755* (2006.01)

(56) References Cited

FOREIGN PATENT DOCUMENTS

| | | | |
|---|---|---|---|
| JP | 2016187766 A | * | 11/2016 |
| JP | 2016211516 A | * | 12/2016 |
| JP | 2019-48268 A | | 3/2019 |
| JP | 2019-85888 A | | 6/2019 |
| WO | 2016/021186 A1 | | 2/2016 |

* cited by examiner

EXHAUST GAS PURIFICATION APPARATUS FOR MOTOR VEHICLES

CROSS REFERENCE TO RELATED APPLICATIONS

The present application claims priority from Japanese patent application JP 2018-181672 filed on Sep. 27, 2018, the content of which is hereby incorporated by reference into this application.

BACKGROUND

Technical Field

The present disclosure relates to an exhaust gas purification apparatus for motor vehicles. More specifically, the present disclosure relates to an exhaust gas purification apparatus for motor vehicles that comprises an exhaust gas purification catalyst comprising $NiFe_2O_4$ as a microwave-absorbing material, a noble metal, and aluminum oxide ($Al_2O_3$), with zinc oxide (ZnO) and copper(II) oxide (CuO) contents being equivalent to or lower than the given levels, and a microwave-generating apparatus.

Description of Related Art

Exhaust gas emitted from internal combustion engines of motor vehicles and the like contains harmful substances, such as carbon monoxide (CO), hydrocarbon (HC), and nitrogen oxide (NOx). Such harmful substances are first purified by exhaust gas purification catalysts and then emitted to the air.

In order to purify harmful substances, in general, temperature of exhaust gas purification catalysts needs to be at least 200° C. Accordingly, heat recovered from exhaust gas is used to heat exhaust gas purification catalysts.

When temperature of exhaust gas purification catalysts has not reached the level necessary for purification, such as immediately after cold starting of engines, however, activity of the exhaust gas purification catalysts is insufficient, and unpurified harmful substances (also referred to as "cold emission") may be emitted to the environment, disadvantageously. Furthermore, in environmentally correct motor vehicles of recent years, temperature of exhaust gas tends to be lowered along with improved thermal efficiency and improved fuel efficiency of engines. Accordingly, even if heat recovered from exhaust gas is used, it may not be possible to heat exhaust gas purification catalysts to the level necessary for exhaust gas purification.

In order to improve warm-up performance, for example, JP H05-171926 A (1993) discloses an apparatus comprising a catalyst chamber having an inflow port and a discharge port for combustion exhaust gas and a combustion exhaust gas purifying catalyst molded body disposed inside the catalyst chamber, wherein a heating material containing metal oxide is held to be in contact with the combustion exhaust gas purifying catalyst molded body and an electromagnetic wave generating part is provided to apply electromagnetic waves to the heating material. Furthermore, JP H05-171926 A (1993) exemplifies three-way catalysts containing platinum, rhodium, and palladium as combustion exhaust gas purifying catalysts and perovskite-type composite oxides as heating materials containing metal oxide.

JP 2016-187766 A discloses a catalyst material for exhaust gas purification that is irradiated with a microwave and is provided on inner surfaces of a plurality of pores provided on a substrate through which exhaust gas is allowed to flow, which is a microwave-heated catalyst material comprising magnetic oxide particles capable of generating heat by absorbing a microwave and a catalyst-carrying coat material for coating the surface of the magnetic oxide particles, wherein the catalyst-carrying coat material has a catalyst-carrying oxide and at least one of Pt, Pd, and Rh carried by the catalyst-carrying oxide. JP 2016-187766 A exemplifies a three-way catalyst as the microwave-heated catalyst material. In addition, JP 2016-187766 A describes that a Curie temperature of magnetic oxide particles is defined, so that microwave heating is autonomously terminated, and deterioration of catalytic properties caused by sintering of noble metal particles is thus suppressed.

WO 2016/021186 A1 discloses an exhaust gas flow path member, which is used for an exhaust gas purification apparatus and temperature thereof is elevated by electromagnetic heating. The such exhaust gas flow path member comprises a particulate magnetic body made of ferrite having a Curie temperature of 250° C. to 450° C., and the magnetic body is made of ferrite represented by $(Ni_{1-x}Zn_x)Fe_2O_4$, wherein x satisfies the condition: $0.3 \leq x < 1$.

SUMMARY

However, in the conventional techniques, when nickel (Ni)-based ferrite that is excellent in microwave absorption and heat generating properties is used as a microwave-absorbing material, a coat layer of an exhaust gas purification catalyst provided in an exhaust gas purification apparatus may be peeled after the durability test.

Accordingly, the present disclosure provides an exhaust gas purification apparatus for motor vehicles that has succeeded in suppressing peeling of a coat layer from an exhaust gas purification catalyst.

Ni-based ferrite is ferromagnetic and thus is excellent in microwave absorbing properties. In the case of single-component ferrite among Ni-based ferrite, in addition, deterioration in microwave absorption is low even at high temperature in exhaust gas from motor vehicles. Accordingly, microwave absorbing properties of exhaust gas purification catalysts containing Ni-based ferrite are effective.

Such exhaust gas purification catalysts containing Ni-based ferrite further contain zinc oxide (ZnO) and/or copper (II) oxide (CuO) to adjust a Curie temperature and/or enhance magnetic permeability.

On the other hand, a coat layer of an exhaust gas purification catalyst comprises aluminum oxide ($Al_2O_3$) from the viewpoint of heat resistance, strength, stability, and catalytic properties. Aluminum oxide has a high specific surface area, and aluminum oxide is heat resistant, and aluminum oxide has sufficient affinity with a catalytic component, such as a noble metal. Thus, aluminum oxide is used.

The present inventors have conducted concentrated studies concerning peeling of a coat layer from an exhaust gas purification catalyst when Ni-based ferrite is used as a microwave-absorbing material. As a result, the present inventors have discovered that exhaust gas purification catalysts containing Ni-based ferrite would experience the reactions and events (1) to (4) described below at high temperature of 900° C. or higher in the rich-stoichiometric-rich changing atmosphere.

(1) ZnO or CuO in the Ni-based ferrite reacts with $Al_2O_3$ at 800° C. or higher. At high temperature of 900° C. or higher, accordingly, $Al_2O_3$ in the coat layer reacts with ZnO or CuO in the Ni-based ferrite, and $ZnAl_2O_4$ or $CuAl_2O_4$ is generated.

(2) In the spinel structure of the Ni-based ferrite, Zn or Cu in the Ni-based ferrite is present in site B instead of Ni. When the reaction in (1) occurs, the spinel structure of the Ni-based ferrite is partially destructed and converted into $Fe_2O_3$. As a result, the volume of the coat layer changes.

(3) As a result of the volume change of the coat layer in (2), adhesion between the substrate and the coat layer is lowered.

(4) As a result of lowered adhesion between the substrate and the coat layer in (3), the coat layer is peeled from the substrate by exhaust gas, and catalytic properties are then deteriorated.

Accordingly, as a result of intensive studies, the present inventors have discovered the following. That is, when an exhaust gas purification apparatus for motor vehicles comprising an exhaust gas purification catalyst heated by a microwave involves use of Ni-based ferrite as a microwave-absorbing material, peeling of a coat layer from the exhaust gas purification catalyst in the exhaust gas purification apparatus can be suppressed even in the changing atmosphere at 900° C. or higher by refraining from use of zinc oxide (ZnO) and copper(II) oxide (CuO) as transition metal oxides, which react with aluminum oxide ($Al_2O_3$) contained in the coat layer, together with $NiFe_2O_4$. Furthermore, the present inventors also have discovered that deterioration in microwave absorbability of a microwave-absorbing material could be suppressed even in the changing atmosphere at 900° C. or higher by further adding nickel oxide (NiO) to a coat layer comprising cerium oxide-zirconium oxide composite oxide ($CeO_2$—$ZrO_2$) of the exhaust gas purification apparatus for motor vehicles. This has led to the completion of the present disclosure.

For example, exemplary embodiments are as follows.

(1) An exhaust gas purification apparatus for motor vehicles comprising:
   an exhaust gas purification catalyst comprising a substrate and a coat layer coated on the substrate comprising a microwave-absorbing material, a noble metal, and aluminum oxide ($Al_2O_3$); and
   a microwave-generating apparatus for heating the microwave-absorbing material located ahead of the exhaust gas purification catalyst with respect to an exhaust gas flow direction,
   wherein
   the microwave-absorbing material includes $NiFe_2O_4$,
   the noble metal includes at least one metal selected from the group consisting of platinum (Pt), palladium (Pd), and rhodium (Rh), and
   contents of zinc oxide (ZnO) and copper(II) oxide (CuO) in the coat layer are 1% by weight or lower based on the total weight of the coat layer.

(2) The exhaust gas purification apparatus for motor vehicles according to (1), wherein the coat layer contains neither zinc oxide nor copper(II) oxide.

(3) The exhaust gas purification apparatus for motor vehicles according to (1), wherein the coat layer further contains cerium oxide-zirconium oxide composite oxide ($CeO_2$—$ZrO_2$) and nickel oxide (NiO).

(4) The exhaust gas purification apparatus for motor vehicles according to (2), wherein the coat layer further contains cerium oxide-zirconium oxide composite oxide ($CeO_2$—$ZrO_2$) and nickel oxide (NiO).

(5) The exhaust gas purification apparatus for motor vehicles according to (3), wherein an amount of the nickel oxide is 2% by weight to 50% by weight based on the total weight of $NiFe_2O_4$.

(6) The exhaust gas purification apparatus for motor vehicles according to (4), wherein an amount of the nickel oxide is 2% by weight to 50% by weight based on the total weight of $NiFe_2O_4$.

(7) The exhaust gas purification apparatus for motor vehicles according to (3), wherein an amount of the nickel oxide is 3% by weight to 30% by weight based on the total weight of $NiFe_2O_4$.

(8) The exhaust gas purification apparatus for motor vehicles according to (4), wherein an amount of the nickel oxide is 3% by weight to 30% by weight based on the total weight of $NiFe_2O_4$.

Effects

The present disclosure provides an exhaust gas purification apparatus for motor vehicles that has succeeded in suppressing peeling of a coat layer from an exhaust gas purification catalyst.

DETAILED DESCRIPTION OF THE EMBODIMENTS

Figure 1:
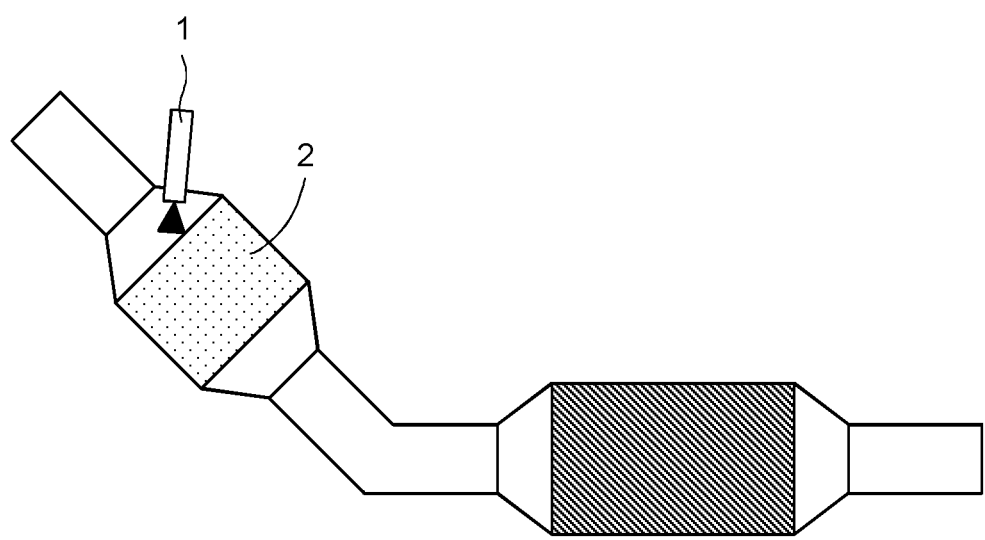
FIG. 1 shows an exhaust gas purification apparatus for motor vehicles according to an embodiment of the present disclosure.

Hereafter, embodiments of the present disclosure are described in detail.

The features of the present disclosure are described with reference to adequate figures herein. In the figures, a dimension and a configuration of each component are exaggerated for clarification and an actual dimension or configuration is not accurately demonstrated. Accordingly, the technical scope of the present disclosure is not limited to the dimension and the configuration of each component demonstrated in the figures. It should be noted that the exhaust gas purification apparatus for motor vehicles of the present disclosure is not limited to the embodiments described below and a person skilled in the art is capable of achieving various types of modification and improvement within the scope of the present disclosure.

The present disclosure relates to an exhaust gas purification apparatus for motor vehicles comprising: an exhaust gas purification catalyst comprising a substrate and a coat layer coated on the substrate comprising a microwave-absorbing material, a noble metal, and aluminum oxide ($Al_2O_3$); and a microwave-generating apparatus for heating the microwave-absorbing material located ahead of the exhaust gas purification catalyst with respect to an exhaust gas flow direction, wherein the microwave-absorbing material includes $NiFe_2O_4$, the noble metal includes at least one metal selected from the group consisting of platinum (Pt), palladium (Pd), and rhodium (Rh), and contents of zinc oxide (ZnO) and copper(II) oxide (CuO) in the coat layer are equivalent to or lower than the given levels, based on the total weight of the coat layer.

In the present disclosure, a substrate is a material on which a coat layer is coated. For example, a known substrate with a honeycomb shape, such as a honeycomb-shaped monolith substrate with hexagonal or square cells, may be used, although the substrate is not limited thereto. Materials constituting such substrate are other than metals that reflect a microwave, and examples thereof include ceramics, such as cordierite, silica, alumina, mullite, and silicon carbide. While the number of cells constituting the honeycomb-shaped monolith substrate is not limited, the number thereof is generally 300 to 900 per square inch, and in some embodiments, may be 400 to 750 per square inch. In the present disclosure, a honeycomb-shaped monolith substrate made of cordierite comprising 400 to 750 cells per square inch may be used as a substrate.

While a length of an exhaust gas flow direction of the substrate is not limited, the length thereof is generally 40 mm to 150 mm, and in some embodiments, may be 50 mm to 110 mm.

A diameter of an exhaust gas inflow port of the substrate (an equivalent circle diameter when the exhaust gas inflow port of the substrate is not a circle) can be adequately changed in accordance with a catalyst volume of interest. The diameter thereof is generally 40 mm to 120 mm, and in some embodiments, may be 50 mm to 110 mm, although the diameter thereof is not limited thereto.

While a volume of the substrate is not limited, the volume thereof is generally 0.3 l to 1.2 l, and in some embodiments, may be 0.4 l to 1.0 l.

The material described above is used as a substrate to acquire an exhaust gas flow path that is sufficient for exhaust gas purification and realize the reaction between exhaust gas and a catalytic component applied to the substrate. Furthermore, a component that absorbs a microwave is also retained to the material as with the catalytic component to raise the temperature.

In the present disclosure, a coat layer coated on the substrate contains a microwave-absorbing material, a noble metal, and aluminum oxide ($Al_2O_3$).

A microwave-absorbing material is a material which generates heat by absorbing a microwave and converting the same into heat. In the present disclosure, a microwave-absorbing material includes $NiFe_2O_4$.

While an amount of $NiFe_2O_4$ is not limited, the amount thereof is generally 3% by weight to 30% by weight, and in some embodiments, may be 5% by weight to 20% by weight, based on the total weight of the exhaust gas purification catalyst.

While a particle diameter of $NiFe_2O_4$ analyzed via laser diffraction/scattering is not limited, the particle diameter thereof is generally 1 μm to 40 μm, and in some embodiments, may be 1 μm to 10 μm.

While a specific surface area of $NiFe_2O_4$ measured by BET method is not limited, the specific surface area thereof is generally 0.1 $m^2/g$ to 30 $m^2/g$, and in some embodiments, may be 1 $m^2/g$ to 30 $m^2/g$.

Since the microwave-absorbing material includes $NiFe_2O_4$, it is capable of efficiently absorbing a microwave applied by a microwave-generating apparatus and converting the microwave into heat.

The microwave-absorbing material may include other microwave-absorbing materials. Examples of microwave-absorbing materials include, but are not limited to, perovskite-type composite oxides, such as lanthanum (La)-cobalt (Co)-based composite oxide, strontium (Sr)-cobalt-based composite oxide, and lanthanum-strontium-cobalt-based composite oxide, ferrites including iron oxide, such as spinel-type ferrite (e.g., cobalt ferrite, magnesium ferrite, and manganese ferrite) and garnet-type ferrite (e.g., yttrium ferrite and lutecium ferrite), manganese oxide, cobalt oxide, zirconium boride, silicon carbide, and tungsten carbide.

While the total weight of microwave-absorbing materials excluding $NiFe_2O_4$ is not limited, the total weight thereof is generally 0% by weight to 100% by weight, and in some embodiments, may be 5% by weight to 30% by weight, based on the total weight of $NiFe_2O_4$.

In general, a noble metal is supported by a carrier.

A carrier is a material that supports a noble metal functioning as a main catalyst. Examples thereof include, but are not limited to, metal oxides, such as aluminum oxide ($Al_2O_3$, alumina), cerium oxide ($CeO_2$, ceria), zirconium oxide ($ZrO_2$, zirconia), silicon oxide ($SiO_2$, silica), yttrium oxide ($Y_2O_3$, yttria), and neodymium oxide ($Nd_2O_3$), and a composite oxide of any two or more thereof. In the present disclosure, a composite oxide of $CeO_2$ and $ZrO_2$ ($CeO_2$—$ZrO_2$) and $Al_2O_3$ may be used as a carrier.

In the present disclosure, the coat layer contains $Al_2O_3$, and the coat layer optionally further contains $CeO_2$—$ZrO_2$. The $Al_2O_3$ and $CeO_2$—$ZrO_2$ may be contained as a carrier that supports a noble metal, or the $Al_2O_3$ and $CeO_2$—$ZrO_2$ may be contained separately from the carrier that supports a noble metal, or the $Al_2O_3$ and $CeO_2$—$ZrO_2$ may be contained both as a carrier that supports a noble metal and separately from the carrier that supports a noble metal.

A noble metal is a material that functions as a main catalyst capable of purifying harmful substances in exhaust gas. In the present disclosure, a noble metal includes at least one metal selected from the group consisting of platinum (Pt), palladium (Pd), and rhodium (Rh). A noble metal may further include, but are not limited to, for example, gold (Au), silver (Ag), iridium (Ir), ruthenium (Ru), or a mixture of any two or more thereof.

While an amount of the noble metal supported by a carrier is not limited, the amount thereof which is expressed in terms of the noble metal is generally 0.2% by weight to 2.0% by weight, and in some embodiments, may be 0.4% by weight to 1.0% by weight, based on the total weight of the exhaust gas purification catalyst.

While an amount of the catalyst coat including the noble metal is not limited, the amount thereof is generally 35% by weight to 60% by weight, and in some embodiments, may be 45% by weight to 56% by weight, based on the total weight of the exhaust gas purification catalyst.

The noble metal can be supported by a conventional method of production. For example, a carrier, such as $Al_2O_3$ and $CeO_2$—$ZrO_2$ and a noble metal precursor, such as hydrochlorate or nitrate of the noble metal are introduced into water at 5° C. to 30° C., and the resultant is stirred with the use of a stirrer to homogeneously disperse, and the dispersion is subjected to dehydration, such as evaporation to dryness, optionally grinding, and then sintering in the air, for example at 450° C. to 550° C. for 0.5 hours to 1.5 hours. Thus, the noble metal can be supported. Grinding can be carried out in accordance with a conventional technique. For example, grinding can be carried out with the use of a mortar, a hammer mill, a ball mill, a bead mill, a jet mill, or a roller mill, and a dry or wet grinding system may be employed.

With the use of the material supporting the noble metal described above, harmful substances in exhaust gas can be efficiently purified.

While an amount of $Al_2O_3$ is not limited, the amount thereof is generally 5% by weight to 50% by weight, and in some embodiments, may be 10% by weight to 40% by weight, based on the total weight of the exhaust gas purification catalyst.

While a particle diameter of $Al_2O_3$ analyzed via laser diffraction/scattering is not limited, the particle diameter thereof is generally 0.1 μm to 30 μm, and in some embodiments, may be 0.1 μm to 10 μm.

While a specific surface area of $Al_2O_3$ measured by BET method is not limited, the specific surface area thereof is generally 10 $m^2/g$ to 120 $m^2/g$, and in some embodiments, may be 30 $m^2/g$ to 100 $m^2/g$.

$Al_2O_3$ may be a material supplemented with a rare earth element, such as La, for stabilization.

Aluminum oxide has a high specific surface area, and aluminum oxide is heat resistant, and aluminum oxide has sufficient affinity with a catalytic component, such as a noble metal. In addition, aluminum oxide is cost-effective.

In the present disclosure, contents of zinc oxide (ZnO) and copper(II) oxide (CuO) in the coat layer are 1% by weight or less, and in some embodiments, may be 0.1% by weight or less, based on the total weight of the coat layer. The contents of zinc oxide (ZnO) and copper(II) oxide (CuO) in the coat layer may be as low as possible, and the lower limit thereof is accordingly not limited. In some embodiments, the coat layer may contain neither ZnO nor CuO.

In the present disclosure, the phrase "coat layer contains neither ZnO nor CuO" means that the coat layer does not substantially contain ZnO or CuO. Accordingly, the phrase "coat layer contains neither ZnO nor CuO" means that the contents of ZnO and CuO in the coat layer may be 0% by weight, based on the total weight of the coat layer, or the coat layer may contain an inevitable amount of ZnO or CuO due to a production method, an apparatus used for production, and/or raw materials used.

In the present disclosure, ZnO and CuO may be Zn and Cu that can be incorporated as a replacement with Ni in the $NiFe_2O_4$ crystalline structure.

When the coat layer contains ZnO and CuO in the amount described above or the coat layer contains neither ZnO nor CuO, in the present disclosure, peeling of the coat layer from the exhaust gas purification catalyst in the exhaust gas purification apparatus can be suppressed.

Such effects are presumed to result from suppression of the volume change of the coat layer by regulating the amount of ZnO and CuO capable of reacting with $Al_2O_3$ at high temperature in the coat layer, although the present disclosure is not limited by such presumption.

In the present disclosure, the coat layer optionally further contains $CeO_2$—$ZrO_2$ and nickel oxide (NiO), in addition to a microwave-absorbing material, a noble metal, and $Al_2O_3$.

The coat layer may further contain $CeO_2$—$ZrO_2$ and NiO, in addition to a microwave-absorbing material, a noble metal, and $Al_2O_3$.

While an amount of $CeO_2$—$ZrO_2$ is not limited, the amount thereof is generally 2% by weight to 50% by weight, and in some embodiments, may be 2% by weight to 40% by weight, based on the total weight of the exhaust gas purification catalyst.

While a particle diameter of $CeO_2$—$ZrO_2$ analyzed via laser diffraction/scattering is not limited, the particle diameter thereof is generally 1 μm to 30 μm, and in some embodiments, may be 1 μm to 10 μm.

While a specific surface area of $CeO_2$—$ZrO_2$ measured by BET method is not limited, the specific surface area thereof is generally 1 $m^2/g$ to 80 $m^2/g$, and in some embodiments, may be 10 $m^2/g$ to 40 $m^2/g$.

Since the coat layer contains $CeO_2$—$ZrO_2$, an oxygen storage capacity (OSC) of the exhaust gas purification catalyst can be developed.

As shown in Table 1 below, NiO shows a smaller change in the valence in the changing atmosphere compared with other transition metal oxides, and NiO has a high melting point even when converted into a metal.

[Table 1]

TABLE 1

Valence and Melting Point of Transition Metals

| Transition metal | 0 | Divalent | 8/3 valent | Trivalent | Tetra-valent | Penta-valent |
|---|---|---|---|---|---|---|
| Sc | 1541 | — | — | 2485 | — | — |
| Ti | 1668 | 1750 | — | 2130 | 1843 | — |
| V | 1910 | — | — | 1970 | 1967 | 690 |
| Cr | 1907 | — | — | 3000-4000 | — | — |
| Mn | 1246 | 1785 | — | 1080 | 535 | — |
| Fe | 1538 | — | 1538 | 1565 | — | — |
| Co | 1495 | 1795 | 900-950 | — | — | — |
| Ni | 1455 | 1984 | — | — | — | — |
| Cu | 1085 | 1236 | — | — | — | — |
| Zn | 420 | 1975 | — | — | — | — |

While an amount of NiO is not limited, the amount thereof is generally 2% by weight to 50% by weight, and in some embodiments, may be 3% by weight to 30% by weight, and in other embodiments, may be 6% by weight to 20% by weight, based on the total weight of the $NiFe_2O_4$.

While a particle diameter of NiO analyzed via laser diffraction/scattering is not limited, the particle diameter thereof is generally 1 μm to 20 μm, and in some embodiments, may be 1 μm to 10 μm.

While a specific surface area of NiO measured by BET method is not limited, the specific surface area thereof is generally 1 $m^2/g$ to 50 $m^2/g$, and in some embodiments, may be 10 $m^2/g$ to 40 $m^2/g$.

In the coat layer, NiO may be present in the vicinity of $NiFe_2O_4$. For example, NiO may be present in contiguity with $NiFe_2O_4$ or in contact with $NiFe_2O_4$.

When the coat layer contains NiO in addition to a microwave-absorbing material $NiFe_2O_4$, deterioration in the microwave absorbing capacity of the microwave-absorbing material $NiFe_2O_4$ at high temperature in the changing atmosphere when the coat layer further contains $CeO_2$—$ZrO_2$ can be suppressed.

Such effects are presumed as described below, although the present disclosure is not limited by the presumption.

When the coat layer further contains $CeO_2$—$ZrO_2$, at high temperature in the changing atmosphere, Ni in $NiFe_2O_4$ that is present in the vicinity of $CeO_2$—$ZrO_2$ is slightly oxidized (but not so much as Ni shows a change in the valence) as the capacity of $CeO_2$—$ZrO_2$ to absorb and release oxygen is exerted. In $NiFe_2O_4$ having an inverse spinel structure, specifically, the spin direction of site A is antiparallel to that of site B, and such difference is a magnetic moment. When $CeO_2$—$ZrO_2$ is present in the vicinity of $NiFe_2O_4$ at high temperature in the changing atmosphere, oxygen released from $CeO_2$—$ZrO_2$ further oxidizes divalent Ni that is present in site B of $NiFe_2O_4$, and then a magnetic moment is decreased. As a result, the magnetic permeability and microwave absorbing capacity of $NiFe_2O_4$ are deteriorated.

When the coat layer further contains NiO, in contrast, NiO that is present in the vicinity of $NiFe_2O_4$ exerts effects of suppressing oxidation of Ni in $NiFe_2O_4$ by oxygen released from $CeO_2$—$ZrO_2$. As a result, deterioration in the magnetic permeability and microwave absorbing capacity of $NiFe_2O_4$ is suppressed at high temperature in the changing atmosphere.

In the present disclosure, the coat layer is composed of at least one layer. For example, the coat layer is composed of 1 layer, 2 layers, 3 layers, 4 layers, or 5 layers or more. When the coat layer is composed of 2 or more layers, $NiFe_2O_4$ as a microwave-absorbing material in the vicinity of which NiO is located, a noble metal, $Al_2O_3$, and $CeO_2$—$ZrO_2$ may be present in any of the layers. Such components may be concurrently present in a plurality of layers. For example, the coat layer is composed of one layer comprising $NiFe_2O_4$ in the vicinity of which NiO is located, a noble metal, $Al_2O_3$, and $CeO_2$—$ZrO_2$.

While the total thickness of all the coat layers coated on the substrate is not limited, the total thickness thereof is generally 50 μm to 150 μm, and in some embodiments, may be 80 μm to 120 μm.

By adopting the thickness of the coat layer described above, a microwave-absorbing material contained in the coat layer can be efficiently brought into contact with a microwave. Thus, a microwave can be efficiently absorbed and converted into heat. In addition, a noble metal contained in the coat layer can be efficiently brought into contact with exhaust gas, and exhaust gas can thus be efficiently purified.

The relative positional relationship among $NiFe_2O_4$ as a microwave-absorbing material in the vicinity of which NiO is located, a noble metal, $Al_2O_3$, and $CeO_2$—$ZrO_2$ in the coat layer is not limited. When $CeO_2$—$ZrO_2$ can be located away from $NiFe_2O_4$, it is not necessary to add NiO. When $CeO_2$—$ZrO_2$ may be in contact with $NiFe_2O_4$, NiO may be provided in the vicinity of $NiFe_2O_4$.

In the present disclosure, $NiFe_2O_4$ may be provided in the vicinity of NiO, so that deterioration in the microwave absorbing capacity of $NiFe_2O_4$ caused by $CeO_2$—$ZrO_2$ can be suppressed. In addition, $NiFe_2O_4$ may be provided in the vicinity of a noble metal, so that a microwave-absorbing material heated by a microwave can efficiently heat the noble metal and improve activity of the noble metal at low temperature.

In the present disclosure, the exhaust gas purification catalyst can be produced by using the materials described above and providing the coat layer containing $NiFe_2O_4$ as a microwave-absorbing material, a noble metal, $Al_2O_3$, $CeO_2$—$ZrO_2$, and NiO on the substrate. The coat layer can be provided in accordance with a conventional coating technique. For example, the exhaust gas purification catalyst can be produced by masking an area other than an area to be coated on a substrate, coating the substrate with a coat layer slurry containing $NiFe_2O_4$ which is stabilized and in the vicinity of which NiO is provided in advance, a noble metal, $Al_2O_3$, and $CeO_2$—$ZrO_2$ via wash coating, blowing away an excess slurry, drying in the air, for example at 120° C. to 150° C. for 0.5 hours to 1.5 hours to remove a solvent, and sintering in the air at 450° C. to 550° C. for 1 hour to 2 hours to form the coat layer. When the coat layer which is composed of 2 or more layers is provided on the substrate in the exhaust gas purification catalyst, the process of forming the coat layer described above may be repeated.

In the present disclosure, NiO may be mixed with $NiFe_2O_4$ in advance, so that $NiFe_2O_4$ can be present in the vicinity of NiO. Thus, deterioration in the microwave absorbing capacity of $NiFe_2O_4$ caused by $CeO_2$—$ZrO_2$ can be efficiently suppressed.

In the present disclosure, a microwave-generating apparatus is an apparatus which generates a microwave that can be absorbed by a microwave-absorbing material. The microwave-generating apparatus is located ahead of the exhaust gas purification catalyst with respect to an exhaust gas flow direction.

The position of the microwave-generating apparatus is not limited, provided that the microwave-generating apparatus is located ahead of the exhaust gas purification catalyst with respect to an exhaust gas flow direction, which is a position at which the microwave-generating apparatus can apply a microwave toward the exhaust gas purification catalyst comprising a substrate coated with a microwave-absorbing material; that is, a position between a position on a horizontal line with respect to the exhaust gas flow direction (an angle formed by a line connecting an exhaust gas inflow port to the middle of the exhaust gas purification catalyst and a line connecting a microwave irradiation port of the microwave-generating apparatus and the middle of the exhaust gas purification catalyst; also referred to as the "microwave irradiation angle:" 0 degrees) and a position on a vertical line with respect to the exhaust gas flow direction (the microwave irradiation angle: 90 degrees). The microwave irradiation angle is generally 30 degrees to 90 degrees, and in some embodiments, may be 45 degrees to 90 degrees.

By positioning the microwave-generating apparatus as described above, a microwave can be efficiently applied to the exhaust gas purification catalyst.

A frequency of a microwave generated by the microwave-generating apparatus can be adequately changed. While the frequency thereof is limited, the frequency thereof is generally 1.5 GHz to 3 GHz, and in some embodiments, may be 2 GHz to 2.5 GHz. In the present disclosure, 2.45 GHz, which is the frequency of a microwave power for industrial application, may be adopted as a frequency of a microwave.

An output power of the microwave-generating apparatus can be adequately changed in accordance with a scale of an exhaust gas purification apparatus for motor vehicles used, a warm-up performance of interest, and other conditions. While the output power thereof is not limited, the output power thereof is generally 200 W to 10 kW, and in some embodiments, may be 500 W to 2 kW. A single-mode or multi-mode microwave-generating apparatus can be used as a microwave-generating apparatus. In the present disclosure, a single-mode microwave-generating apparatus may be used.

FIG. 1 shows an exhaust gas purification apparatus for motor vehicles according to an embodiment of the present disclosure. FIG. 1 shows an exhaust gas purification apparatus for motor vehicles comprising: an exhaust gas purification catalyst (2); and a microwave-generating apparatus (1) for heating a microwave-absorbing material located ahead of the exhaust gas purification catalyst (2) with respect to an exhaust gas flow direction; and another catalyst is located behind the exhaust gas purification apparatus for motor vehicles with respect to the exhaust gas flow direction. By providing another catalyst, purification performance can further be improved. Exhaust gas enters the exhaust gas purification apparatus for motor vehicles through an exhaust gas inflow tube, and the exhaust gas passes through the exhaust gas purification catalyst (2), and the exhaust gas is then discharged from an exhaust gas outflow tube. In FIG. 1, the microwave irradiation angle is approximately 45 degrees.

The exhaust gas purification apparatus for motor vehicles comprising the exhaust gas purification catalyst and the microwave-generating apparatus of the present disclosure can be used as an exhaust gas purification apparatus for motor vehicles known in the art. While an application of the exhaust gas purification apparatus for motor vehicles is not limited, the exhaust gas purification apparatus for motor vehicles can be used in the form of a three-way catalyst in a gasoline automobile engine, a hybrid automobile engine, and a plug-in hybrid automobile engine, and in the form of an oxidation catalyst in a diesel automobile engine.

With the use of the exhaust gas purification apparatus for motor vehicles comprising the exhaust gas purification catalyst and the microwave-generating apparatus of the present disclosure, heat efficiency is improved, and power consumption is reduced. This can improve fuel efficiency.

EXAMPLES

Hereafter, the present disclosure is described with reference to examples, although the scope of the present disclosure is not limited to these examples.

1. Sample Preparation

Comparative Example 1: Preparation of an Exhaust Gas Purification Catalyst with a Coat Layer Containing $NiFe_2O_4$, Pd, $Al_2O_3$, ZnO, CuO, and $CeO_2$—$ZrO_2$ (1) Preparation of a Powder Sample A powder, wherein 0.77 g of Pd was supported on a powder mixture of 15 g of a Ni-based ferrite powder containing ZnO (13% by weight based on the total weight of the Ni-based ferrite powder) and CuO (4% by weight based on the total weight of the Ni-based ferrite powder), 1.67 g of $CeO_2$—$ZrO_2$, and 15 g of $Al_2O_3$, 2 g of barium sulfate, 1 g of alumina sol, and 64 g of water were mixed in a ball mill for 8 hours to prepare a catalyst slurry.

The catalyst slurry was dried at 120° C. and heated in the air at 500° C. for 2 hours to obtain a powder sample.

(2) Preparation of an Exhaust Gas Purification Catalyst

A catalyst slurry having the same composition as the catalyst slurry prepared in the process (1) was prepared. The catalyst slurry comprises: a powder, wherein 7.7 g of Pd was supported on a powder mixture of 150 g of a Ni-based ferrite powder comprising ZnO (13% by weight based on the total weight of the Ni-based ferrite powder) and CuO (4% by weight based on the total weight of the Ni-based ferrite powder), 16.7 g of $CeO_2$—$ZrO_2$, and 150 g of $Al_2O_3$; 20 g of barium sulfate; 10 g of alumina sol; and 640 g of water. The resulting catalyst slurry (100 g) was coated to a cordierite honeycomb monolith substrate (diameter: 103 mm; length: 105 mm; 600 cell/in$^2$; 2-mil) as a substrate by introducing and sucking the catalyst slurry. Thereafter, the resultant was dried at 120° C. and sintered at 500° C. to prepare an exhaust gas purification catalyst.

Example 1: Preparation of an Exhaust Gas Purification Catalyst with a Coat Layer Containing $NiFe_2O_4$, Pd, $Al_2O_3$, $CeO_2$—$ZrO_2$, and NiO (10% by Weight) but Containing Neither ZnO Nor CuO (1) Preparation of a Powder Sample A NiO powder was added to a $NiFe_2O_4$ powder in an amount of 10% by weight based on the total weight of the $NiFe_2O_4$ powder, and the resultant was subjected to wet mixing to obtain a slurry. The slurry was dried at 120° C. and heated in the air at 800° C. for 5 hours to obtain a powder.

A powder, wherein 0.77 g of Pd was supported on a powder mixture of 16.5 g of the powder prepared above, 1.67 g of $CeO_2$—$ZrO_2$, and 15 g of $Al_2O_3$, 2 g of barium sulfate, 1 g of alumina sol, and 64 g of water were mixed in a ball mill for 8 hours to prepare a catalyst slurry.

The catalyst slurry was dried at 120° C. and heated in the air at 500° C. for 2 hours to obtain a powder sample.

(2) Preparation of an Exhaust Gas Purification Catalyst

A catalyst slurry having the same composition as the catalyst slurry prepared in the process (1) was prepared. The catalyst slurry comprises: a powder, wherein 7.7 g of Pd was supported on a powder mixture of 165 g of $NiFe_2O_4$ supplemented with 10% by weight of a NiO powder, 16.7 g of $CeO_2$—$ZrO_2$, and 150 g of $Al_2O_3$; 20 g of barium sulfate; 10 g of alumina sol; and 640 g of water. The resulting catalyst slurry was coated to a cordierite honeycomb monolith substrate (diameter: 103 mm; length: 105 mm; 600 cell/in$^2$; 2-mil) as a substrate by introducing and sucking the catalyst slurry. The weight of the catalyst slurry was adjusted to be 100 g after sintering. Thereafter, the resultant was dried at 120° C. and sintered at 500° C. to prepare an exhaust gas purification catalyst.

Example 2: Preparation of an Exhaust Gas Purification Catalyst with a Coat Layer Containing $NiFe_2O_4$, Pd, $Al_2O_3$, and $CeO_2$—$ZrO_2$ but Containing Neither ZnO Nor CuO (1) Preparation of a Powder Sample A powder, wherein 0.77 g of Pd was supported on a powder mixture of 16.5 g of a $NiFe_2O_4$ powder, 1.67 g of $CeO_2$—$ZrO_2$, and 15 g of $Al_2O_3$, 2 g of barium sulfate, 1 g of alumina sol, and 64 g of water were mixed in a ball mill for 8 hours to prepare a catalyst slurry.

The catalyst slurry was dried at 120° C. and heated in the air at 500° C. for 2 hours to obtain a powder sample.

(2) Preparation of an Exhaust Gas Purification Catalyst

A catalyst slurry having the same composition as the catalyst slurry prepared in the process (1) was prepared. The catalyst slurry comprises: a powder, wherein 7.7 g of Pd was supported on a powder mixture of 165 g of $NiFe_2O_4$, 16.7 g of $CeO_2$—$ZrO_2$, and 150 g of $Al_2O_3$; 20 g of barium sulfate; 10 g of alumina sol; and 640 g of water. The resulting catalyst slurry was coated to a cordierite honeycomb monolith substrate (diameter: 103 mm; length: 105 mm; 600 cell/in$^2$; 2-mil) as a substrate by introducing and sucking the catalyst slurry. The weight of the catalyst slurry was adjusted to be 100 g after sintering. Thereafter, the resultant was dried at 120° C. and sintered at 500° C. to prepare an exhaust gas purification catalyst.

Example 3: Preparation of an Exhaust Gas Purification Catalyst with a Coat Layer Containing $NiFe_2O_4$, Pd, $Al_2O_3$, $CeO_2$—$ZrO_2$, and NiO (2% by Weight) but Containing Neither ZnO Nor CuO (1) Preparation of a Powder Sample A NiO powder was added to a $NiFe_2O_4$ powder in an amount of 2% by weight based on the total weight of the $NiFe_2O_4$ powder, and the resultant was subjected to wet mixing to obtain a slurry. The slurry was dried at 120° C. and heated in the air at 800° C. for 5 hours to obtain a powder.

A powder, wherein 0.77 g of Pd was supported on a powder mixture of 15.3 g of the powder prepared above, 1.67 g of $CeO_2$—$ZrO_2$, and 15 g of $Al_2O_3$, 2 g of barium sulfate, 1 g of alumina sol, and 64 g of water were mixed in a ball mill for 8 hours to prepare a catalyst slurry.

The catalyst slurry was dried at 120° C. and heated in the air at 500° C. for 2 hours to obtain a powder sample.

Example 4: Preparation of an Exhaust Gas Purification Catalyst with a Coat Layer Containing $NiFe_2O_4$, Pd, $Al_2O_3$, $CeO_2$—$ZrO_2$, and NiO (30% by Weight) but Containing Neither ZnO Nor CuO (1) Preparation of a Powder Sample A NiO powder was added to a $NiFe_2O_4$ powder in an amount of 30% by weight based on the total weight of the $NiFe_2O_4$ powder, and the resultant was subjected to wet mixing to obtain a slurry. The slurry was dried at 120° C. and heated in the air at 800° C. for 5 hours to obtain a powder.

A powder, wherein 0.77 g of Pd was supported on a powder mixture of 19.5 g of the powder sample prepared above, 1.67 g of $CeO_2$—$ZrO_2$, and 15 g of $Al_2O_3$, 2 g of barium sulfate, 1 g of alumina sol, and 64 g of water were mixed in a ball mill for 8 hours to prepare a catalyst slurry.

The catalyst slurry was dried at 120° C. and heated in the air at 500° C. for 2 hours to obtain a powder sample.

Example 5: Preparation of an Exhaust Gas Purification Catalyst with a Coat Layer Containing $NiFe_2O_4$, Pd, $Al_2O_3$, $CeO_2$—$ZrO_2$, and NiO (50% by Weight) but Containing Neither ZnO Nor CuO (1) Preparation of a Powder Sample A NiO powder was added to a $NiFe_2O_4$ powder in an amount of 50% by weight based on the total weight of the $NiFe_2O_4$ powder, and the resultant was subjected to wet mixing to obtain a slurry. The slurry was dried at 120° C. and heated in the air at 800° C. for 5 hours to obtain a powder.

A powder, wherein 0.77 g of Pd was supported on a powder mixture of 22.5 g of the powder sample prepared above, 1.67 g of $CeO_2$—$ZrO_2$, and 15 g of $Al_2O_3$, 2 g of barium sulfate, 1 g of alumina sol, and 64 g of water were mixed in a ball mill for 8 hours to prepare a catalyst slurry.

The catalyst slurry was dried at 120° C. and heated in the air at 500° C. for 2 hours to obtain a powder sample.

2. Sample Analysis 2-1. X-Ray Powder Diffraction (XRD) Analysis

The powder samples obtained in the process (1) of Comparative Example 1 (1), the process (1) of Example 1 (1), and the process (1) of Example 2 (1) in "1. Sample Preparation" were subjected to a durability test described below and then subjected to XRD analysis.

(Durability Test)

The powder samples are placed in a furnace and held in an exhaust gas-mimicking atmosphere (switching from a rich atmosphere (1% CO diluted with $N_2$, 10% $H_2O$) to a lean atmosphere (5% $O_2$ diluted with $N_2$, 10% $H_2O$) every 5 minutes) at 1000° C. for 5 hours, and the furnace is then cooled.

Figure 2:
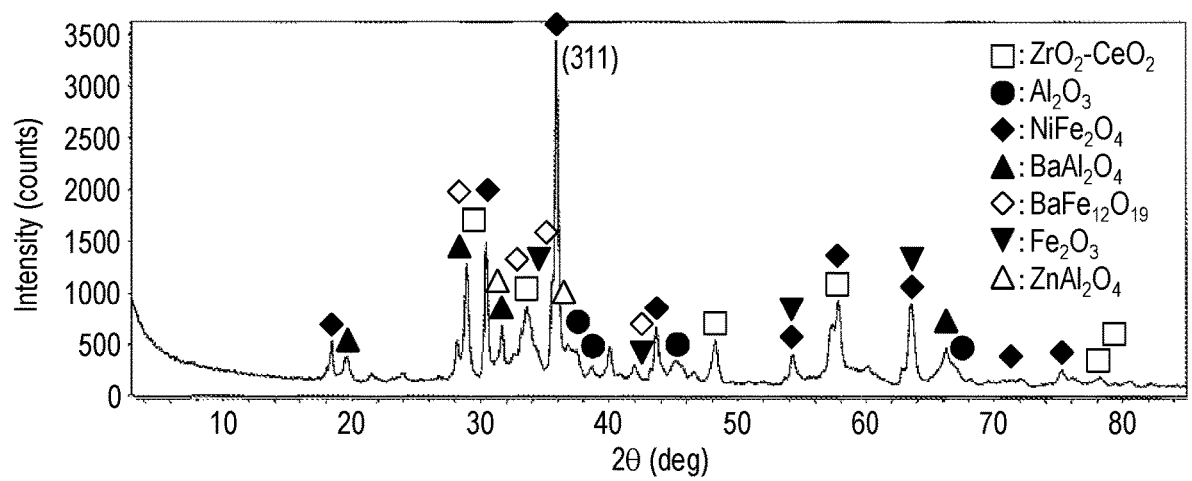
FIG. 2 shows the results of XRD analysis of the powder obtained in the process (1) of Comparative Example 1 in "1. Sample Preparation" after the durability test.
Figure 3:
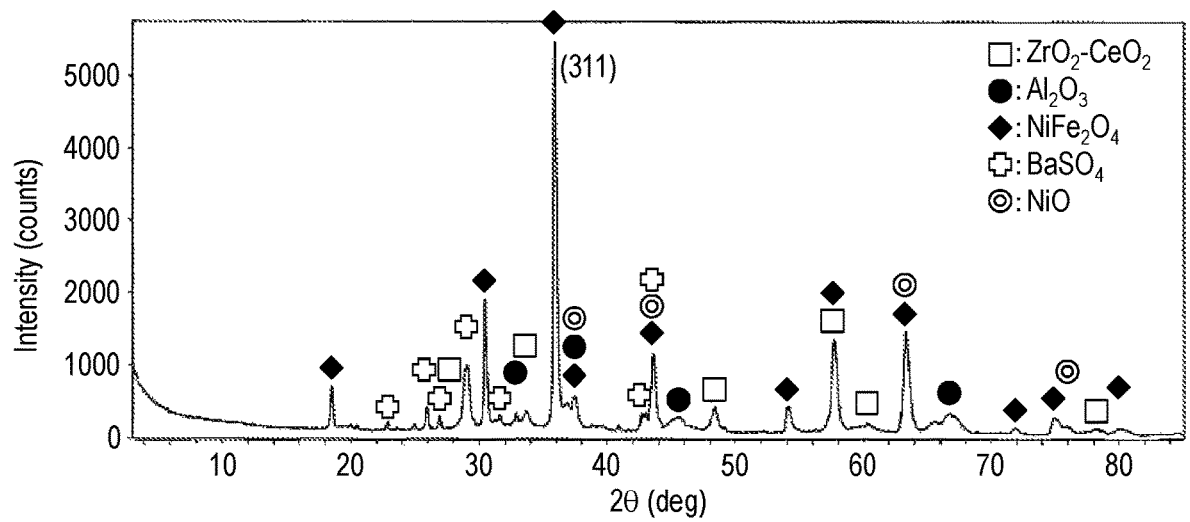
FIG. 3 shows the results of XRD analysis of the powder obtained in the process (1) of Example 1 in "1. Sample Preparation" after the durability test.
Figure 4:
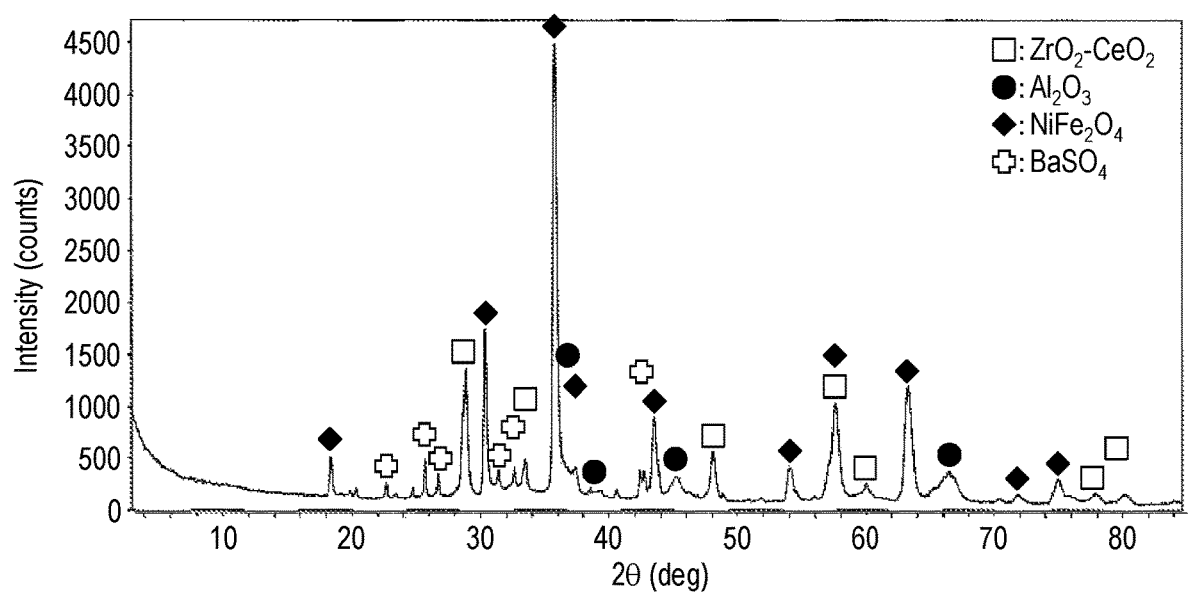
FIG. 4 shows the results of XRD analysis of the powder obtained in the process (1) of Example 2 in "1. Sample Preparation" after the durability test.

FIG. 2 shows the results of XRD analysis of the powder obtained in the process (1) of Comparative Example 1 after the durability test, and FIG. 3 shows the results of XRD analysis of the powder obtained in the process (1) of Example 1 after the durability test, and FIG. 4 shows the results of XRD analysis of the powder obtained in the process (1) of Example 2 after the durability test.

The results shown in FIG. 2 demonstrate that $Fe_2O_3$ and $BaFe_{12}O_{19}$ were detected as Fe-containing components in addition to $NiFe_2O_4$ from the powder obtained in the process (1) of Comparative Example 1 after the durability test. $ZnAl_2O_4$ was also detected. It is deduced that Zn comprised in Ni-based ferrite reacts with $Al_2O_3$, and the spinel structure is partially destructed, and $Fe_2O_3$ or $BaFe_{12}O_{19}$ is generated as a consequence. While $CuAl_2O_3$ may be generated based on the composition of components added, generation of $CuAl_2O_3$ could not be detected. It is deduced that the amount of the added components was small. Meanwhile, the results shown in FIG. 3 and FIG. 4 demonstrate that no Fe-containing components other than $NiFe_2O_4$ were detected in the powder obtained in the process (1) of Example 1 after the durability test and the powder obtained in the process (1) of Example 2 after the durability test and that no structural change was observed in $NiFe_2O_4$. Accordingly, it was found that structural change of Ni-based ferrite could be suppressed by refraining from adding ZnO and CuO to a coat layer.

2-2. Coat Layer Peeling Test

The exhaust gas purification catalysts prepared in the process (2) of Comparative Example 1, the process (2) of Example 1, and the process (2) of Example 2 in "1. Sample Preparation" were subjected to a durability test with the use of live gas at 1000° C. for 50 hours. After the durability test was carried out, the percentage of peeling of the coat layer from each exhaust gas purification catalyst: [{(the amount of peeling of the coat layer)/(the total amount of the coat layer)}×100] was determined.

Figure 5:
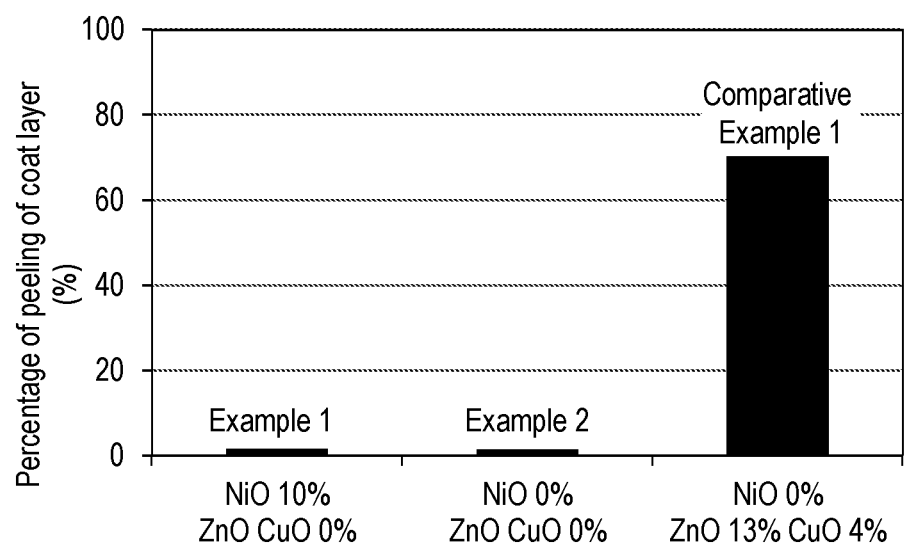
FIG. 5 shows the percentage of peeling of the coat layer from the exhaust gas purification catalysts obtained in the process (2) of Comparative Example 1, the process (2) of Example 1, and the process (2) of Example 2 in "1. Sample Preparation" after the durability test.

The results are shown in FIG. 5.

FIG. 5 demonstrates that the percentage of peeling of the coat layer was as high as 70% in the case of the exhaust gas purification catalyst with a coat layer containing ZnO and CuO of Comparative Example 1. In the case of the exhaust gas purification catalysts containing neither ZnO nor CuO of Examples 1 and 2, in contrast, the percentage of peeling of the coat layer was 2% or lower. It was thus found that peeling of the coat layer could be suppressed by refraining from adding ZnO and CuO to the coat layer. The reaction between ZnO or CuO and $Al_2O_3$ in Ni-based ferrite occurs at relatively low temperature under an atmosphere in which the transition from reduction to oxidation or vice versa occurs. With the addition of an additive capable of suppressing the reaction to Ni-based ferrite, accordingly, the effects thereof are considered to be insignificant.

2-3. Test of Microwave-Induced Temperature Increase

The powder samples prepared in the process (1) of Example 1, the process (1) of Example 2, the process (1) of Example 3, the process (1) of Example 4, and the process (1) of Example 5 in "1. Sample Preparation" were evaluated in terms of efficiency of microwave-induced temperature increase in the manner described below.

(Method of Measurement)

The powder samples (25 g each) are introduced into Pyrex petri dishes, and temperatures of the powder samples are measured using an infrared surface thermometer. The powder samples are irradiated with a microwave using a microwave dryer, and then temperatures of the powder samples are measured again using the infrared surface thermometer. The difference in temperature between before and after microwave application is designated as temperature increase.

Subsequently, the powder samples are subjected to a durability test in an exhaust gas-mimicking atmosphere (switching from a rich atmosphere (1% CO diluted with $N_2$, 10% $H_2O$) to a lean atmosphere (5% $O_2$ diluted with $N_2$, 10% $H_2O$) every 5 minutes (R/L)) at 1000° C. for 5 hours.

After the durability test, the powder samples (25 g each) are introduced into Pyrex petri dishes, and temperatures of the powder samples are measured using the infrared surface thermometer. The powder samples are irradiated with a microwave using a microwave dryer, and temperatures of the powder samples are measured again using the infrared surface thermometer. The difference in temperature between before and after microwave application is designated as temperature increase.

Figure 6:
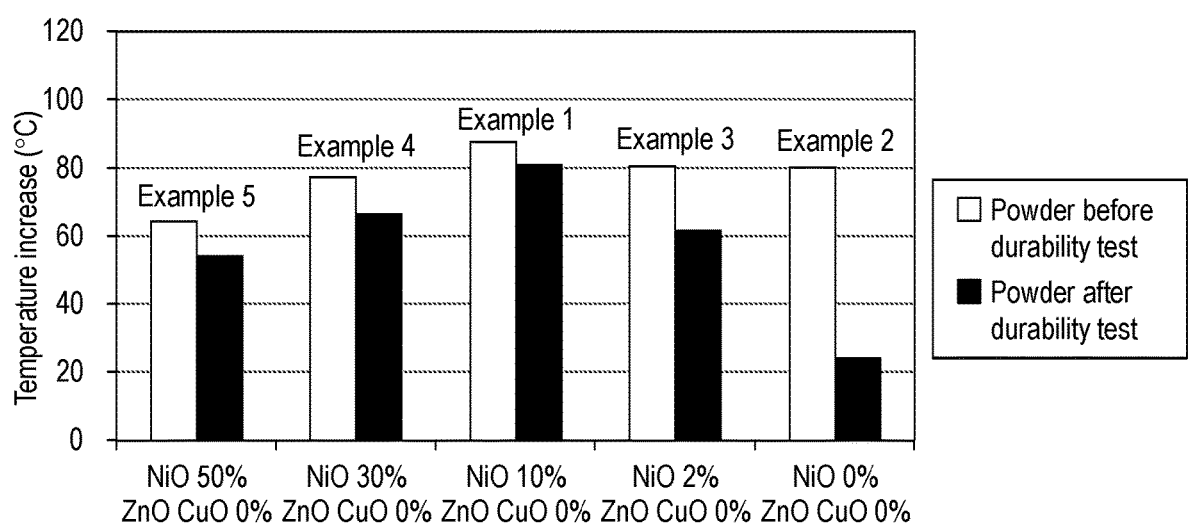
FIG. 6 shows temperature increase caused by microwave application of powders obtained in the process (1) of Example 1, the process (1) of Example 2, the process (1) of Example 3, the process (1) of Example 4, and the process (1) of Example 5 in "1. Sample Preparation" and those powders after the durability test.

The results are shown in FIG. 6.

FIG. 6 demonstrates that deterioration in temperature increase of the powder sample prepared in the process (1) of Example 1 after the durability test based on temperature increase thereof before the durability test: [{(temperature increase of the powder sample before the durability test– temperature increase of the powder sample after the durability test)/(temperature increase of the powder sample before the durability test)}×100] (hereafter, referred to as "the percentage of lowering of temperature increase") was 10% or lower, and the percentage of lowering of temperature increase of the powder sample obtained in the process (1) of Example 2 was about 70%, and the percentage of lowering of temperature increase of the powder sample obtained in the process (1) of Example 3 was about 24%, and the percentage of lowering of temperature increase of the powder sample obtained in the process (1) of Example 4 was about 14%, and the percentage of lowering of temperature increase of the powder sample obtained in the process (1) of Example 5 was about 16%. When NiO was further added to the coat layer containing $CeO_2$—$ZrO_2$, accordingly, it was found that deterioration in the microwave absorbing capacity of $NiFe_2O_4$ caused by $CeO_2$—$ZrO_2$ could be suppressed efficiently. It was further found that such effects would vary depending on the amount of NiO, and such effects would be enhanced as the amount of NiO reached 10% by weight based on the total weight of the $NiFe_2O_4$ powder, and such effects would be gradually lowered as the amount of NiO exceeded the aforementioned level.

All publications, patents and patent applications cited in the present description are herein incorporated by reference as they are.

DESCRIPTION OF SYMBOLS

1. Microwave-generating apparatus
2. exhaust gas purification catalyst

What is claimed is:

1. An exhaust gas purification apparatus for motor vehicles comprising:
    an exhaust gas purification catalyst comprising a substrate and a coat layer coated on the substrate comprising a microwave-absorbing material, a noble metal, and aluminum oxide ($Al_2O_3$); and
    a microwave-generating apparatus for heating the microwave-absorbing material located ahead of the exhaust gas purification catalyst with respect to an exhaust gas flow direction,
    wherein
    the microwave-absorbing material includes $NiFe_2O_4$,
    the noble metal includes at least one metal selected from the group consisting of platinum (Pt), palladium (Pd), and rhodium (Rh), wherein the coat layer further contains cerium oxide-zirconium oxide composite oxide ($CeO_2$—$ZrO_2$) and nickel oxide (NiO); and wherein the NiO content in the coat layer is sufficient and ZnO and CuO in the coat layer are limited to below a level sufficient to reduce deterioration and peeling of the coat layer; and
    contents of zinc oxide (ZnO) and copper(II) oxide (CuO) in the coat layer are 1% by weight or lower based on the total weight of the coat layer.

2. The exhaust gas purification apparatus for motor vehicles according to claim 1, wherein the coat layer contains neither zinc oxide nor copper(II) oxide.

3. The exhaust gas purification apparatus for motor vehicles according to claim 1, wherein an amount of the nickel oxide is 2% by weight to 50% by weight based on the total weight of $NiFe_2O_4$.

4. The exhaust gas purification apparatus for motor vehicles according to claim 1, wherein an amount of the nickel oxide is 2% by weight to 50% by weight based on the total weight of $NiFe_2O_4$.

5. The exhaust gas purification apparatus for motor vehicles according to claim 1, wherein an amount of the nickel oxide is 3% by weight to 30% by weight based on the total weight of $NiFe_2O_4$.

6. The exhaust gas purification apparatus for motor vehicles according to claim 1, wherein an amount of the nickel oxide is 3% by weight to 30% by weight based on the total weight of $NiFe_2O_4$.

7. The exhaust gas purification apparatus for motor vehicles of claim 1, wherein the contents of zinc oxide (ZnO) and copper(II) oxide (CuO) in the coat layer are below a threshold that reduces peeling of the coat layer in an atmosphere above 900° C.

* * * * *